United States Patent Office 2,862,037
Patented Nov. 25, 1958

2,862,037

VULCANIZED RUBBER COMPOSITION CONTAINING A METAL SALT COMPLEX AND PROCESS OF PREPARING SAME

John Kempton Aiken, Entwistle, near Bolton, England, assignor to The Geigy Company Limited, Manchester, England, a British company No Drawing. Application March 1, 1955
Serial No. 491,550

Claims priority, application Great Britain March 2, 1954

7 Claims. (Cl. 260—800)

This invention relates to improvements in natural rubber articles which may come into contact with water, especially hot water.

The object of the invention is to minimise the ill-effects of copper and other heavy metals in water, upon rubber articles which may be in contact with or immersed in it.

It is known that rubber articles, for example, hot water bottles, rubber tubing and the like, which are brought into contact with water are liable to suffer serious deterioration when the water contains, as is often the case, even very small quantities (5 p. p. m. or less) of copper. Such quantities of copper can be expected to be present if the water has been piped through copper or brass pipes.

We have now found that this deterioration can be very substantially minimised by incorporating in the rubber an alkali metal/alkaline earth metal complex of a polyamine polycarboxylic acid which forms stable water-soluble complexes with heavy metals, such as, for example, nitrilotriacetic or ethylene diamine tetra-acetic acids. The compounds do not cause discoloration of the rubber on exposure to light.

As examples of sequestering compounds falling within the scope of the invention may be quoted the disodium calcium complex of ethylene diamine tetraacetic acid which has been given the formula:

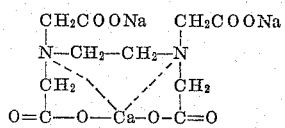

and similar salts such as the dipotassium calcium salt and the disodium or dipotassium barium salt of ethylene diamine tetraacetic acid.

The said compounds are incorporated in the rubber at any stage prior to vulcanization, but are preferably added to the rubber mix. They may be incorporated during milling and may be employed either in the solid form or as an aqueous solution. The said compounds have a high resistance to strong heating and are able to withstand the severe conditions of vulcanization with a high degree of stability. Whilst it is not intended to limit the invention to the following theory, we believe the protective effect of these water-soluble complexes to be due to a slow but regular leaching of the complex contained in the rubber into any water which comes into contact with the rubber. Heavy metal ions contained in the said water will be sequestered by the complex and will thus not induce deterioration of the rubber. This theory is supported by the fact that when the complex is milled into the rubber, it has no effect on copper or other heavy metals already contained in the rubber.

We have found that satisfactory protection may be obtained when one or a mixture of the said compounds is incorporated to the extent of 0.1 to 2.0% by weight based on the total weight of the rubber mix.

We have also found that particularly good results are obtained when a mixture containing equal quantities of ethylene diamine tetraacetic acid and symmetrical di-β-naphthyl paraphenylene diamine is used. Such a mixture may also be incorporated to the extent of from 0.1 to 2.0% by weight based on the total weight of the rubber mix.

The invention will be further illustrated by reference to the following example:

Example

Natural rubber, suitable for use in hot water bottles, was compounded using the following formula together with various pigments:

|  | Parts by weight |
|---|---|
| Pale crepe rubber | 100 |
| Zinc oxide | 5 |
| Whiting | 80 |
| Stearic acid | 1 |
| Sulphur | 1.5 |
| Paraffin wax | 0.5 |
| Mercaptobenzthiazole | 1 |
| Tetra methyl thiuram disulphide | 0.25 |
| Organic pigment | 1.5 |
| Symmetrical di-β-naphthyl paraphenylene diamine | 0.5 |
| Ethylene diamine tetra-acetic acid di-sodium calcium complex | 0.5 |

The vulcanisation was effected over a period of 7 minutes at a pressure of 60 pounds. The resulting rubbers exhibited a markedly increased resistance to copper and other heavy metal induced deterioration, the number of rejects for this reason being reduced to one tenth of that experienced with natural rubbers not containing the inhibitors according to the invention. Similar increases in resistance to such deterioration are obtained when substantially similar proportions of other alkali metal-alkaline earth metal complexes of ethylene diamine tetraacetic acid or of nitrilo triacetic acid are incorporated.

The complexes incorporated in the rubber according to the present invention may be used in conjunction with any other materials customarily used in rubber compounding, such as accelerators, lubricants, softeners, fillers, pigments, etc.

I claim:

1. A heat vulcanised natural rubber containing a salt, the cation of which is alkali metal and the anion of which is the complex anion formed by the combination of one atom of an alkaline earth metal with one molecule of an amine polycarboxylic acid selected from the group consisting of nitrilo triacetic acid and ethylene diamine tetraacetic acid.

2. A heat vulcanised natural rubber containing from 0.1% to 2% by weight of a salt, the cation of which is alkaline metal and the anion of which is the complex anion formed by the combination of one atom of an alkaline earth metal with one molecule of an amine polycarboxylic acid selected from the group consisting of nitrilo triacetic acid and ethylene diamine tetraacetic acid.

3. A heat vulcanized natural rubber containing a salt, the cation of which is alkali metal and the anion of which is the complex anion formed by the combination of one atom of an alkaline earth metal with one molecule of ethylene diamine tetraacetic acid.

4. A heat vulcanised natural rubber containing from 0.1% to 2% by weight of a mixture consisting of symmetrical di-β-naphthyl paraphenylene diamine and a salt, the cation of which is alkali metal and the anion of which is the complex anion formed by the combination of one atom of alkaline earth metal with one molecule of an amine polycarboxylic acid selected from the group consisting of nitrilo triacetic acid and ethylene diamine tetraacetic acid.

5. In a process for preparing a heat vulcanized natural rubber from a rubber mix, the improvement for making said rubber resistant to deterioration caused by copper and other heavy metals which comprises incorporating in said rubber mix from 0.1% to 2% by weight based on the total weight of said rubber mix of a salt, the cation of which is alkali metal and the anion of which is the complex anion formed by the combination of one atom of an alkaline earth metal with one molecule of an amine polycarboxylic acid selected from the group consisting of nitrilo triacetic acid and ethylene diamine tetraacetic acid, and thereafter submitting said rubber mix to heat vulcanisation.

6. In a process of preparing a heat vulcanized natural rubber from a rubber mix, the improvement for making said rubber resistant to the deterioration caused by copper and other heavy metals, which comprises incorporating said rubber mix from 0.1% to 2% by weight based on the total weight of said rubber mix, of a mixture consisting of equal proportions of di-$\beta$-naphthyl paraphenylene diamine and a salt the cation of which is alkali metal and the anion of which is the complex anion formed by the combination of one atom of an alkaline earth metal with one molecule of an amine polycarboxylic acid selected from the group consisting of nitrilo triacetic acid and ethylene diamine tetraacetic acid, and thereafter subjecting the rubber mix to heat vulcanisation.

7. In a process for preparing a heat vulcanized natural rubber from a rubber mix, the improvement for making said rubber resistant to the deterioration caused by copper and other heavy metals which comprises incorporating in said rubber mix a mixture consisting of di-$\beta$-naphthyl paraphenylene diamine and the disodium salt of the complex anion formed by combination of one atom of an alkaline earth metal and one molecule of ethylene diamine tetraacetic acid and thereafter subjecting the rubber mix to heat vulcanisation.

References Cited in the file of this patent
UNITED STATES PATENTS 2,667,522    McElroy _____ Jan. 26, 1954

FOREIGN PATENTS 154,169    Australia _____ Nov. 16, 1953

OTHER REFERENCES

"Chemistry of the Metal Chelate Compounds," by Martell et al., published 1952 by Prentice-Hall, pages 205, 206, 509 and 569.